(12) United States Patent
Ohtomo et al.

(10) Patent No.: US 6,649,927 B2
(45) Date of Patent: Nov. 18, 2003

(54) TILT DETECTING DEVICE

(75) Inventors: Fumio Ohtomo, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/090,248

(22) Filed: Mar. 4, 2002

(65) Prior Publication Data

US 2002/0139940 A1 Oct. 3, 2002

(30) Foreign Application Priority Data

Mar. 28, 2001 (JP) ........................................ 2001-094003

(51) Int. Cl.$^7$ ................................................. G01C 9/06
(52) U.S. Cl. ................................ 250/559.3; 250/222.1; 33/366.16; 33/366.23; 356/249
(58) Field of Search ............................. 250/559.3, 559.4, 250/559.39, 559.11, 221, 222.1, 225, 573, 577, 575; 356/138, 249, 399, 148, 400; 33/366.11, 366.12, 366.15, 366.16, 366.23, 366.24

(56) References Cited

U.S. PATENT DOCUMENTS

| | | | |
|---|---|---|---|
| 5,485,266 A | * | 1/1996 | Hirano et al. ............... 356/249 |
| 5,517,023 A | * | 5/1996 | Ohtomo et al. .............. 250/234 |
| 5,893,215 A | | 4/1999 | Kumagai et al. .............. 33/366 |
| 5,907,907 A | * | 6/1999 | Ohtomo et al. ............... 33/291 |
| 6,108,075 A | * | 8/2000 | Otomo et al. ................ 356/138 |
| 6,204,498 B1 | * | 3/2001 | Kumagai et al. ........... 250/222.1 |
| 6,473,714 B1 | * | 10/2002 | Kumagai et al. ............ 702/150 |

* cited by examiner

Primary Examiner—Diego Gutierrez
Assistant Examiner—Amy R. Cohen
(74) Attorney, Agent, or Firm—Nields & Lemack

(57) ABSTRACT

A tilt detecting device for detecting tilt by a reflection light from a free liquid surface, comprising a photodetection element, a liquid member for forming the free liquid surface, a fixed reflection member fixed on a structural member, a free liquid surface light projecting system for projecting a light toward the liquid member, a fixed reflection member light projecting system for projecting a light toward the fixed reflection member, a photodetection optical system for guiding the reflection light from the free liquid surface of the liquid member and a reflection light from the fixed reflection member toward the photodetection element, and an arithmetic processing unit for calculating deviation based on two reflection images received by the photodetection element.

13 Claims, 5 Drawing Sheets

→ S-POLARIZED LIGHT
◆ P-POLARIZED LIGHT

TILT DETECTING DEVICE

BACKGROUND OF THE INVENTION

The present invention relates to a tilt detecting device using a liquid member to form a free liquid surface.

The present applicant proposed a tilt detecting device using a free liquid surface and a survey instrument comprising the tilt detecting device in JP-A-11-118482(U.S. Pat. No. 6,204,498).

Referring to FIG. 11 and FIG. 12, description will be given on general features of the tilt detecting device as described in JP-A-11-118482.

A first light source 1, e.g. an LED, for emitting a light beam in a horizontal direction is provided. On an optical axis of the first light source 1, a first condenser lens 2, a first pattern 3, a second condenser lens 4, and a first half-mirror 5 are arranged. On an optical axis of a reflection light from the first half-mirror 5, a liquid member 6 is disposed, and the liquid member 6 is accommodated in a container 7 so that a free liquid surface 6a is formed. As a material of the liquid member 6, a liquid having adequate viscosity, e.g. silicone oil, is used. The first light source 1 and the free liquid surface 6a of the liquid member 6 are arranged at conjugate positions.

The light beam reflected by the first half-mirror 5 is reflected by the free liquid surface 6a and passes through the first half-mirror 5. On an optical axis of the transmission light from the first half-mirror 5, a third condenser lens 9 and a photodetection means 11 are arranged.

The light beam emitted from the first light source 1 is turned to a parallel beam by the first condenser lens 2. The light beam passing through the first pattern 3 passes through the condenser lens 4 and is reflected upward by the first half-mirror 5 and is reflected by the free liquid surface 6a. Then, after passing through the first half-mirror 5 and the third condenser lens 9, the beam is received by the photodetection means 11. The second condenser lens 4 and the third condenser lens 9 form an image of the first pattern 3 on the photodetection means 11. The result of the photodetection of the photodetection means 11 is inputted to an arithmetic processing unit 13.

A reference position is set on the photodetection means 11. When the tilt detecting device itself is at a horizontal position, a pattern image reflected from the free liquid surface 6a and formed on the photodetection means 11 is aligned with the reference position.

When the tilt detecting device is tilted at an angle of θ, the free liquid surface 6a is relatively tilted with respect to the device at an angle of θ because the free liquid surface 6a is maintained in a horizontal direction. Therefore, if it is supposed that a refractive index of the liquid member 6 is n, the light beam reflected by the free liquid surface 6a is deflected at an angle of 2nθ with respect to the incident light optical axis. If it is supposed that a focal length of the third condenser lens 9 is f, an amount of movement L on the photodetection means 11 is given by the following equation (1).

$$L = f \times \tan(2n\theta) \quad (1)$$

By the arithmetic processing unit 13, the value L of the pattern image with respect to the reference position can be calculated, and tilting θ of the tilt detecting device itself can be further obtained by inverse calculation.

In the conventional type tilt detecting device as described above, the reference position is set on the photodetection element, and there is possibility that the reference position is changed over time with respect to a main unit of the surveying instrument which comprises the tilt detecting device. Also, the photodetection element may be moved due to the change of environmental temperature. In such case, there has been a problem that the reference position is displaced, and error may occur in the tilt detection.

Also, in a system provided with the tilt detecting device, e.g. in a surveying instrument, etc., a unit having a function suitable for the work is removably mounted in some cases. In these cases, only tilting of an assembly where the tilt detecting device is mounted can be detected by the conventional type tilt detecting device, and tilting of the unit remains indefinite.

SUMMARY OF THE INVENTION

It is an object of the present invention to provide a tilt detecting device, by which it is possible to accurately detect tilting without being influenced by error over time or by the change in environmental temperature, and further, to detect tilting including other assembly or assemblies even when other assembly or assemblies are mounted on an assembly where the tilt detecting device is provided.

To attain the above object, the tilt detecting device according to the present invention detects tilt by a reflection surface from a free liquid surface and comprises a photodetection element, a liquid member for forming the free liquid surface, a fixed reflection member fixed on a structural member, a free liquid surface light projecting system for projecting a light toward the liquid member, a fixed reflection member light projecting system for projecting a light toward the fixed reflection member, a photodetection optical system for guiding the reflection light from the free liquid surface of the liquid member and a reflection light from the fixed reflection member toward the photodetection element, and an arithmetic processing unit for calculating deviation based on two reflection images received by the photodetection element. Further, the present invention provides the tilt detecting device as described above, wherein a first pattern is provided in the free liquid surface light projecting system, and a second pattern is provided in the fixed reflection member light projecting system, and the reflection images are pattern images. Also, the present invention provides the tilt detecting device as described above, wherein the first pattern and the second pattern are darkfield patterns. Further, the present invention provides the tilt detecting device as described above, wherein the free liquid surface light projecting system and the fixed reflection member light projecting system project linearly polarized light beams of the same phase, wherein a λ/4 polarization member is provided in a common optical path for incidence and reflection of the light to and from the liquid member, wherein a λ/4 polarization member is provided in a common optical path for incidence and reflection of the light to and from the fixed reflection member, and wherein the photodetection optical system comprises a polarization optical member, which allows only the reflection light from the liquid member and the fixed reflection member to pass. Also, the present invention provides the tilt detecting device as described above, wherein a direction of polarization of the projected light beam is determined by a polarizing plate. Further, the present invention provides the tilt detecting device as described above, wherein each of the free liquid surface light projecting system, the fixed reflection member light projecting system, and the photodetection optical system comprises a beam splitter, and the beam splitter has a surface tilted with respect to a transmission light passing through a semi-transmitting surface. Also, the present invention provides the tilt detecting device as described above, wherein the free liquid surface light projecting system and the fixed reflection member light projecting system comprise a common light source, and a beam splitter for splitting the light beam from the light source to a light beam directed to the liquid member and a light beam directed to the fixed reflection member. Further, the present invention provides the tilt detecting device as described above, wherein there is provided a pattern arranged in such manner that the light beam from the common light source can pass through, and the pattern further comprises a pattern where the light beam directed to the liquid member can pass through and a pattern where the light beam directed to the fixed reflection member can pass through. Also, the present invention provides the tilt detecting device as described above, wherein the liquid member is accommodated in a container, and an upper surface of the container is tilted with respect to the transmission light passing through the free liquid surface. Further, the present invention provides the tilt detecting device as described above, wherein the free liquid surface light projecting system comprises a half-mirror for reflecting the light beam toward the liquid member and for allowing the reflection light from the liquid member to pass, and the half-mirror and the liquid member are optically integrated with each other. Also, the present invention provides the tilt detecting device as described above, wherein the half-mirror and the liquid member are optically integrated with each other via an optical member. Further, the present invention provides the tilt detecting device as described above, wherein a refractive index of the liquid member is approximately equal to a refractive index of the optical member. Also, the present invention provides the tilt detecting device as described above, wherein an anti-reflection membrane is provided between the liquid member and the optical member.

DETAILED DESCRIPTION OF THE INVENTION

Figure 1:
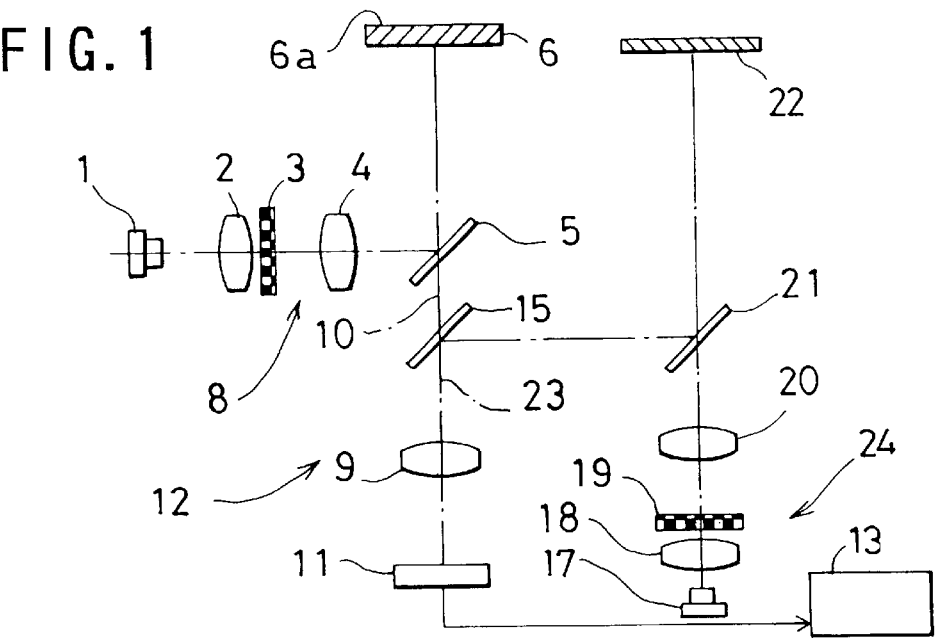
FIG. 1 is a basic block diagram of an embodiment of the present invention.

Description will be given below on embodiments of the present invention referring to the drawings.

Figure 11:
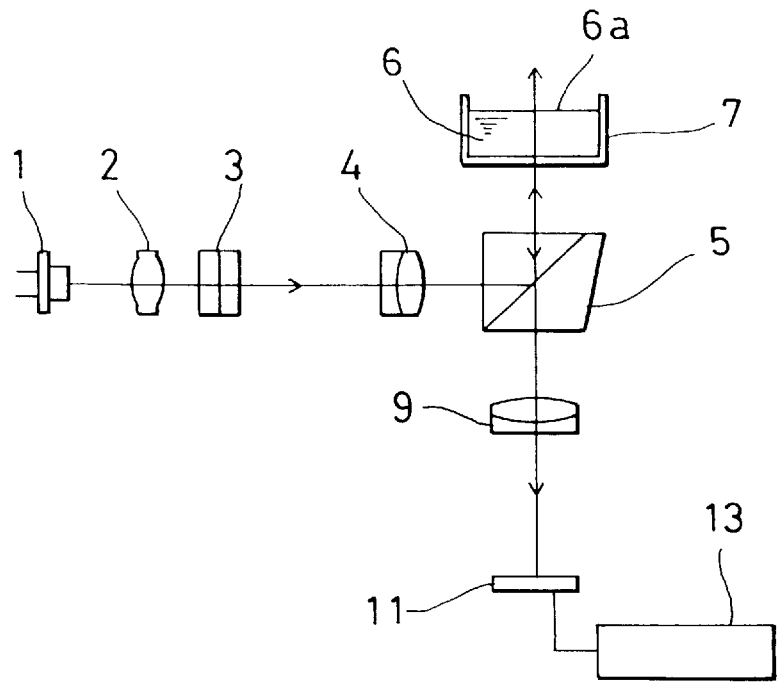
FIG. 11 is a basic block diagram of a conventional type device.
Figure 12:
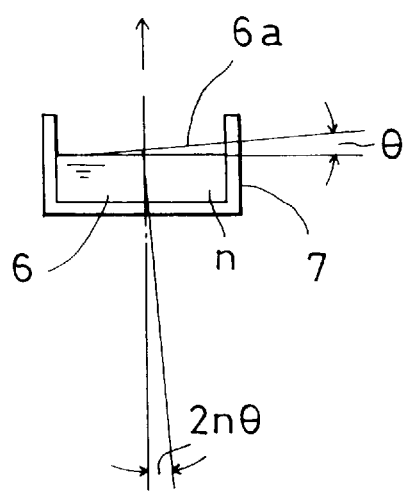
FIG. 12 is a drawing to explain a deflection angle between a free liquid surface and a reflection light.

Description will be given now on a first embodiment of the present invention referring to FIG. 1. In FIG. 1, the same component as shown in FIG. 11 is referred by the same symbol.

A first light source 1, e.g. an LED, for emitting a light beam in a horizontal direction is provided. On an optical axis of the first light source 1, a first condenser lens 2, a first pattern 3, a second condenser lens 4, and a first half-mirror 5 are arranged. On an optical axis of a reflection light from the first half-mirror 5, a liquid member 6 is disposed, and the liquid member 6 is accommodated in a container (not shown) so that a free liquid surface 6a is formed. As a material of the liquid member 6, a liquid having adequate viscosity, e.g. silicone oil, is used. The first light source 1 and the free liquid surface 6a may be arranged at positions conjugate to each other. By arranging these components at conjugate positions, a reflection area on the free liquid surface 6a is minimized, and this makes it possible to minimize error caused by surface tension of the liquid member 6. Further, it provides an effect to reduce a volume of the liquid member 6.

The first light source 1, the first condenser lens 2, the first pattern 3, the second condenser lens 4, and the first half-mirror 5, etc. make up together a free liquid surface light projecting system 8.

The light beam reflected by the first half-mirror 5 is reflected by the free liquid surface 6a and passes through the first half-mirror 5. On an optical axis 10 of the transmission light from the first half-mirror 5, a second half-mirror 15, a third condenser lens 9, and a photodetection means 11 are arranged. As the photodetection means 11, a CCD area sensor is used, for instance.

A second light source 17 is provided, which has a projection light optical axis in parallel to the transmission light optical axis 10 of the first half-mirror 5. On a projection light optical axis of the second light source 17, a fourth condenser lens 18, a second pattern 19, a fifth condenser lens 20, and a third half-mirror 21 are arranged, and the third half-mirror 21 faces to the second half-mirror 15.

On a transmission light optical axis of the third half-mirror 21, a reflection member 22 is disposed at a position perpendicular to the transmission light optical axis. The reflection member 22 is mounted on a structural member such as a housing of the tilt detecting device. Therefore, when the tilt detecting device itself is placed accurately at a horizontal position, a reflection surface of the reflection member 22 is at a horizontal position.

The second light source 17, the fourth condenser lens 18, the second pattern 19, the fifth condenser lens 20, and the third half-mirror 21, etc. make up together a fixed reflection member light projecting system 24. The first half-mirror 5, the second half-mirror 15, the third half-mirror 21, the third condenser lens 9, and the photodetection means 11, etc. make up together a photodetection optical system 12.

The light beam emitted from the first light source 1 is turned to a parallel beam by the first condenser lens 2. After the beam passes through the first pattern 3 and the second condenser lens 4, the beam is reflected by the first half-mirror 5. Further, the beam is reflected by the free liquid surface 6a. Then, after passing through the first half-mirror 5, the second half-mirror 15 and the third condenser lens 9, the beam is received by the photodetection means 11. That is, a first pattern image 3a (not shown) of the first pattern 3 is formed on the photodetection means 11 by the third condenser lens 9.

The light beam emitted from the second light source 17 is turned to a parallel beam and the beam passes through the second pattern 19. Further, the beam passes through the fifth condenser lens 20 and the third half-mirror 21 and is reflected by the reflection member 22. The beam is then reflected by the third half-mirror 21 and the second half-mirror 15 and is received by the photodetection means 11 via the third condenser lens 9. That is, a second pattern image 19a (not shown) of the second pattern 19 is also formed on the photodetection means 11 by the third condenser lens 9.

A reflection light optical axis 23 of the reflection light from the reflection member 22 as reflected by the second half-mirror 15 is aligned with the transmission light optical axis 10 when the transmission light optical axis 10 is in a vertical direction. Therefore, the first pattern image 3a of the first pattern 3 is aligned with the second pattern image 19a of the second pattern 19.

The transmission light optical axis 10 is the optical axis of the light reflected by the free liquid surface 6a. Therefore, when the tilt detecting device itself is tilted, the free liquid surface 6a of the liquid member 6 is relatively tilted with respect to the tilt detecting device itself. As a result, the reflection light optical axis 23 is deflected with respect to the incident light optical axis.

As described above, when the free liquid surface 6a is tilted at an angle of θ, the reflection light optical axis is deflected at an angle of 2nθ where n is a refractive index of the liquid member 6. As given by the equation (1), the first pattern image 3a is moved from the reference position by an amount of f×tan(2nθ) on the photodetection means 11.

On the other hand, the projection light optical axis of the fixed reflection member light projecting system 24 is fixed with respect to the tilt detecting device itself, and the reflection member 22 is also fixed with respect to the tilt detecting device itself. Therefore, a light receiving position of the light beam reflected by the reflection member 22 on the photodetection means 11 (i.e. a position of the second pattern image 19a) is fixed regardless of tilting of the tilt detecting device itself.

A deviation of the first pattern image 3a from the second pattern image 19a can be detected as an amount of movement L of the first pattern image 3a. By detecting a direction of the first pattern 3 with respect to the second pattern image 19a on the photodetection means 11, it is also possible to detect a tilting direction.

In an arithmetic processing unit 13, the deviation between the first pattern image 3a and the second pattern image 19a is calculated based on a photodetection signal from the photodetection means 11. Further, based on the deviation, a tilting amount and a tilting direction are calculated.

The second pattern image 19a from the photodetection optical system 12 is used as a reference. When the tilt detecting device itself is at the horizontal position, the reflection light optical axis 23 of the light from the reflection member 22 may not necessarily be aligned with or may not be parallel to the reflection light optical axis 23 of the light from the free liquid surface 6a. It would suffice if the fixed second pattern image 19a is formed on the photodetection means 11 regardless of the tilting of the tilt detecting device itself. Further, when the tilt detecting device itself is at the horizontal position, the first pattern image 3a and the second pattern image 19a may not necessarily be aligned with each other on the photodetection means 11, and the deviation amount between these two pattern images should be used as a correction value for calculation.

Now, description will be given on calculation of the amount of movement L of the first pattern image 3a.

Figure 2:
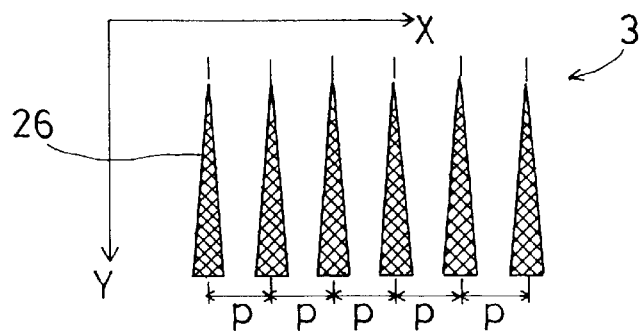
FIG. 2 is a diagram to explain a pattern used in the embodiment.
Figure 3:
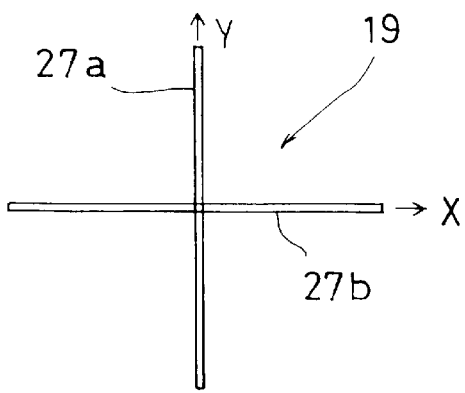
FIG. 3 is a diagram to explain another pattern used in the embodiment.

To produce the first pattern 3 and the second pattern 19, an opaque pattern is formed on a transparent substrate or a pattern is perforated on an opaque substrate, and a darkfield pattern is formed. The first pattern 3 is shown in FIG. 2, for instance, and the second pattern 19 is shown in FIG. 3, for instance.

First, description will be given on the first pattern 3. The first pattern 3 comprises a row of slits where slits 26 are formed by perforation with predetermined equal spacing (pitch) p. It is supposed now that a direction of the row of slits is in an X-axis direction, for instance. Each of the slits 26 is designed in an oblong triangular shape with its width gradually reduced in one direction, and its longitudinal direction is aligned with a Y-axis direction.

Next, the second pattern 19 is formed by perforating slits 27a and 27b in a cross-shape. When it is projected on the photodetection means 11, the slit 27a runs in parallel to the Y-axis direction, and the slit 27b is in parallel to the X-axis direction. The slit 27b crosses the slit 26.

As described above, when the tilt detecting device itself is tilted, the free liquid surface 6a is relatively tilted with respect to the tilt detecting device itself, and it is moved on the photodetection means 11 by an amount of f×tan(2nθ).

Figure 4:
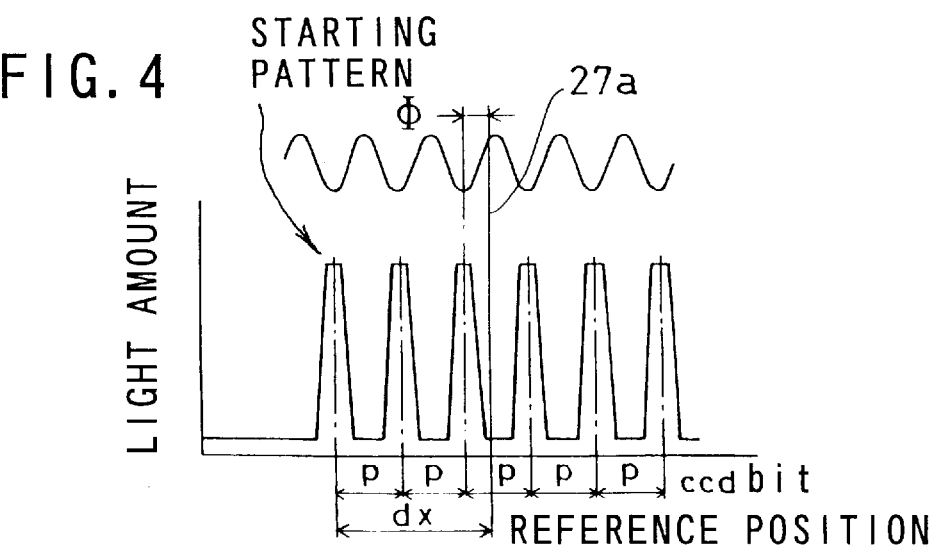
FIG. 4 is a diagram of an output of a photodetection means obtained by receiving a light of the pattern.

As shown in FIG. 4, by taking notice on a specific pattern of the slits 26, 26 . . . as a starting pattern, a horizontal reference position, i.e. a distance dx between the slit 27a on the photodetection means 11 and the starting pattern should be measured.

For the distance shorter than the pitch spacing, a phase difference φ from the horizontal reference position with respect to the pitch spacing is calculated by Fourier transform of the output of the photodetection means 11.

$$\phi \times p/(2\pi) \qquad (2)$$

By calculating φ from the equation (2), the distance shorter than the pitch spacing can be measured with high accuracy. By adding this to the distance longer than the pitch spacing as obtained from the distance of the starting pattern, the total distance can be calculated.

Regarding the amount of movement (tilt angle) in the Y-axis direction, the amount of movement (tilt angle) in the Y-axis direction is calculated from the triangular shape of the slit 26 with its width gradually changed.

That is, the slit 27b is projected so that it crosses the slit 26 in the X-axis direction and the slit 27b is not moved. Therefore, when the tilt detecting device itself is tilted in the Y-axis direction, the width of the triangular slit 26 which the slit 27b crosses is changed. The amount of the change is proportional to the tilt angle in the Y-axis direction. The arithmetic processing unit 13 can calculate the tilt angle in the Y-axis direction based on the change of the width.

To ensure high measurement accuracy, calculation is made on the width of crossing for all of the slits 26, and an average value $dy_{ave}$ is obtained. From a pitch width p and proportional relationship k determined in advance, it is possible to calculate the distance L on the photodetection means 11 from the following equation (3).

$$L = k \times dy_{ave}/p \qquad (3)$$

Further, the tilting in the Y-axis direction can be calculated from the equation (1).

The shape of the slit 26 with its width gradually changing is not limited to the triangular shape. The slit of any shape may be used so far as the width is changed and correspondence to the tilting is set.

Figure 5:
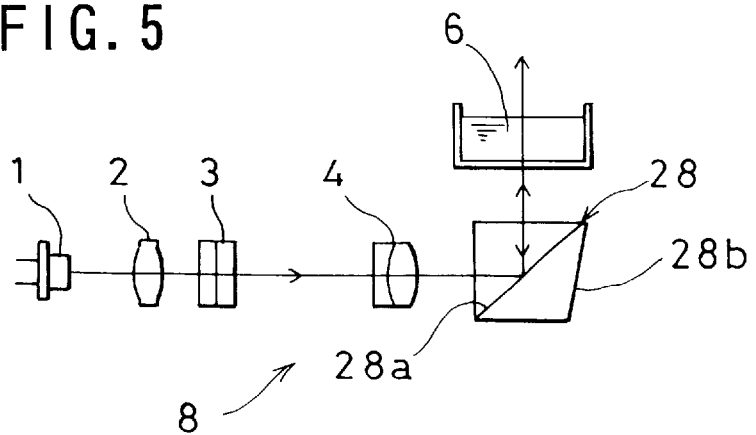
FIG. 5 is a schematical block diagram of an essential part of a second embodiment of the present invention.

Referring to FIG. 5, description will be given on a second embodiment of the present invention.

In FIG. 5, the same component as in FIG. 1 is referred by the same symbol, and detailed description is not given here.

In the embodiment of FIG. 5, the first half-mirror 5, the second half-mirror 15 and the third half-mirror 21 are changed. Because these are changed in similar manner, explanation is given below only on the first half-mirror 5.

A beam splitter 28 having a semi-transmitting surface 28a is used as the first half-mirror 5. The beam splitter 28 has a surface 28b tilted with respect to a transmission light, which passes through the semi-transmitting surface 28a, among the light beam coming from the first light source 1.

The surface 28b reflects the light beam passing through the semi-transmitting surface 28a by deflecting the light beam from the incident light optical axis, and a reflection light from the surface 28b does not enter the photodetection means 11. For this reason, noise is decreased in the light beam received by the photodetection means 11.

Figure 6:
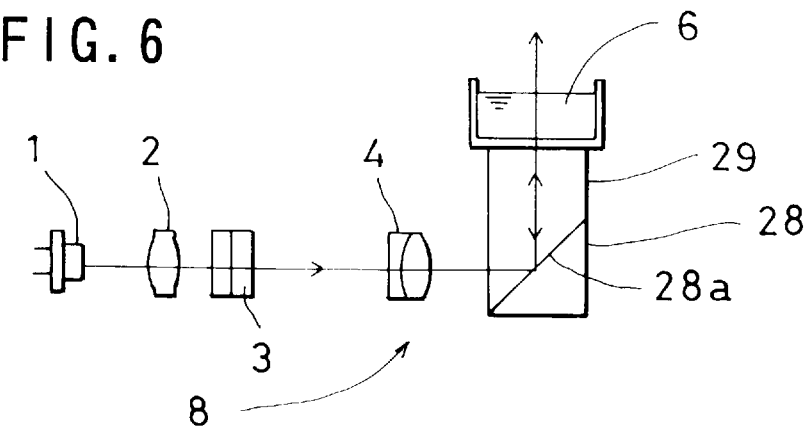
FIG. 6 is a schematical block diagram of an essential part of a third embodiment of the present invention.

Referring to FIG. 6, description will be given on a third embodiment of the present invention.

In FIG. 6, the same component as in FIG. 1 is referred by the same symbol, and detailed description is not given here.

In FIG. 6, there is provided an optical member 29, which optically integrates the semi-transmitting surface 28a with the liquid member 6. The optical member 29 has a refractive index equal or similar to the refractive index of the liquid member 6. For this reason, reflection and refraction on a boundary surface between the liquid member 6 and the optical member 29 are prevented. This makes it possible to prevent generation of an unnecessary reflection light, and measurement can be made with high accuracy.

When the refractive indexes are different between the optical member 29 and the liquid member 6, an anti-reflection membrane using a medium, which has a refractive index between the refractive index of the optical member 29 and that of the liquid member 6 may be provided on a surface where the optical member 29 comes into contact with the liquid member 6, and the reflection light at the boundary surface can be reduced.

Figure 7:
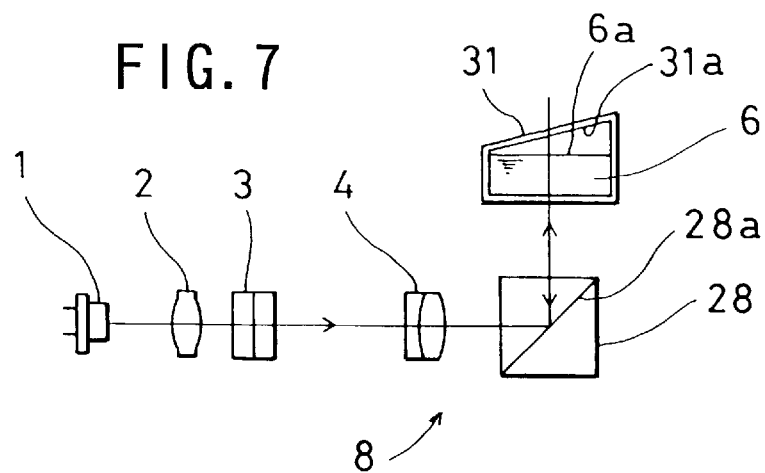
FIG. 7 is a schematical block diagram of an essential part of a fourth embodiment of the present invention.

Referring to FIG. 7, description will be given on a fourth embodiment of the present invention.

In FIG. 7, the same component as in FIG. 1 is referred by the same symbol, and detailed description is not given here.

In the fourth embodiment, the liquid member 6 is sealed in a container 31.

An upper inner surface of the container 31, i.e. an upper inner surface 31a facing to the free liquid surface 6a, is tilted with respect to the free liquid surface 6a.

The photodetection means 11 receives the reflection light reflected by the free liquid surface 6a. Most of the light beam (90% or more) entering the liquid member 6 pass through the free liquid surface 6a. As a result, compared with the light amount of the light reflected by the free liquid surface 6a, a light amount of the reflection light reflected by the upper inner surface 31a of the container 31 is not a negligible value. When the upper inner surface 31a is tilted, the reflection light is deflected by the upper inner surface 31a, and it is deviated from the reflection light reflected by the free liquid surface 6a, and the reflection light from the upper inner surface 31a is not received by the photodetection means 11.

Therefore, S/N ratio of the receiving light on the photodetection means 11 is increased, and this contributes to the improvement of measurement accuracy.

Figure 8:
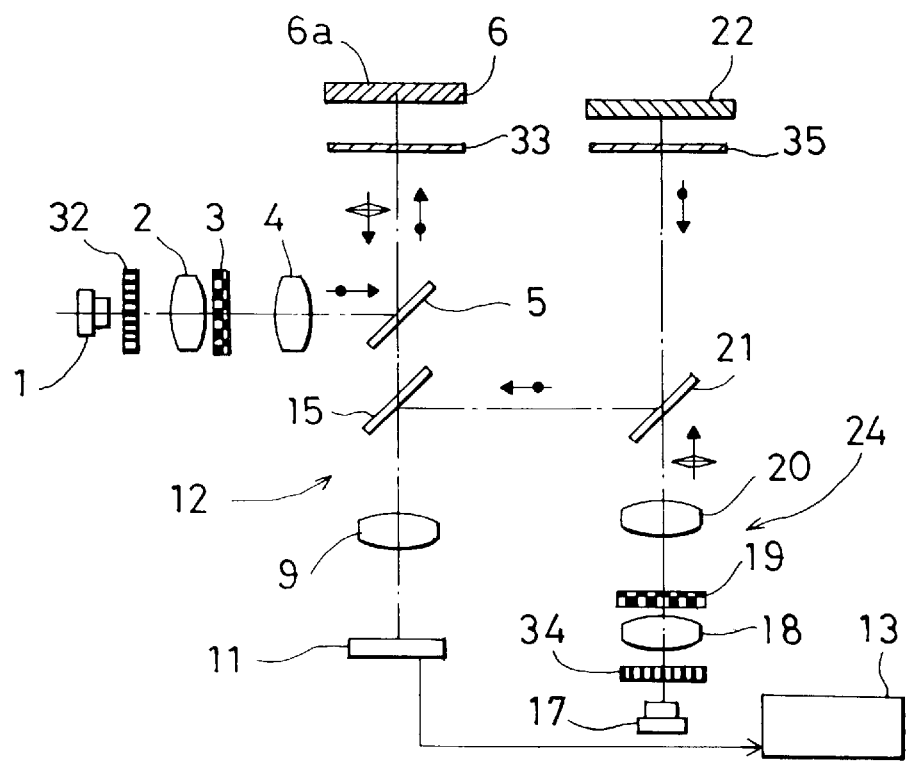
FIG. 8 is a schematical block diagram of an essential part of a fifth embodiment of the present invention.

Referring to FIG. 8, description will be given on a fifth embodiment of the tilt detecting device.

In FIG. 8, the same component as in FIG. 1 is referred by the same symbol, and detailed description is not given here.

In the fifth embodiment, a polarization member is added to the arrangement shown in FIG. 1, and transmission and reflection efficiency is improved in the first half-mirror 5, the second half-mirror 15, and the third half-mirror 21 in the embodiment of FIG. 1.

A first polarizing plate 32 is disposed between the first light source 1 and the first condenser lens 2, and a first $\lambda/4$ polarization member 33 is arranged between the liquid member 6 and the first half-mirror 5, i.e. in a common optical path for incidence and reflection of the light beam. Similarly, a second polarizing plate 34 is arranged between the second light source 17 and the fourth condenser lens 18, and a second $\lambda/4$ polarization member 35 is disposed between the reflection member 22 and the third half-mirror 21. A polarization beam splitter is used as each of the first half-mirror 5, the second half-mirror 15, and the third half-mirror 21. The first half-mirror 5, the second half-mirror 15, and the third half-mirror 21 reflect an S-polarized light and allow a P-polarized light to pass.

As the light source, a light source such an LED, etc. is used so as not to define polarization.

The light beam emitted from the first light source 1 is turned to an S-polarized linearly polarized light by the first polarizing plate 32 and enters the first half-mirror 5. As described above, the first half-mirror 5 serves as a polarization beam splitter, which reflects the S-polarized light and allows the P-polarized light to pass. Therefore, the light beam from the first light source 1 is reflected toward the liquid member 6. The light beam reflected by the liquid member 6 passes through the first $\lambda/4$ polarization member 33 twice, and the light beam is turned to a P-polarized linearly polarized light. Therefore, the light beam passes through the first half-mirror 5 and the second half-mirror 15 and is received by the photodetection means 11.

The light beam emitted from the second light source 17 is a P-polarized linearly polarized light, and the light beam passes through the third half-mirror 21 and is reflected by the reflection member 22. When the light beam is reflected by the reflection member 22, the light beam passes through the second $\lambda/4$ polarization member 35 twice, and the reflection light is turned to an S-polarized light. Therefore, the light beam is reflected by the third half-mirror 21 and the second half-mirror 15 and is received by the photodetection means 11.

As described above, reflection and transmission are performed using polarization, and this contributes to the improvement of efficiency. The light receiving amount on the photodetection means 11 is increased, and this leads to the improvement of measurement accuracy.

If a light source emitting a linearly polarized laser beam such as a semiconductor laser is used, the first polarizing plate 32 and the second polarizing plate 34 can be omitted.

Figure 9:
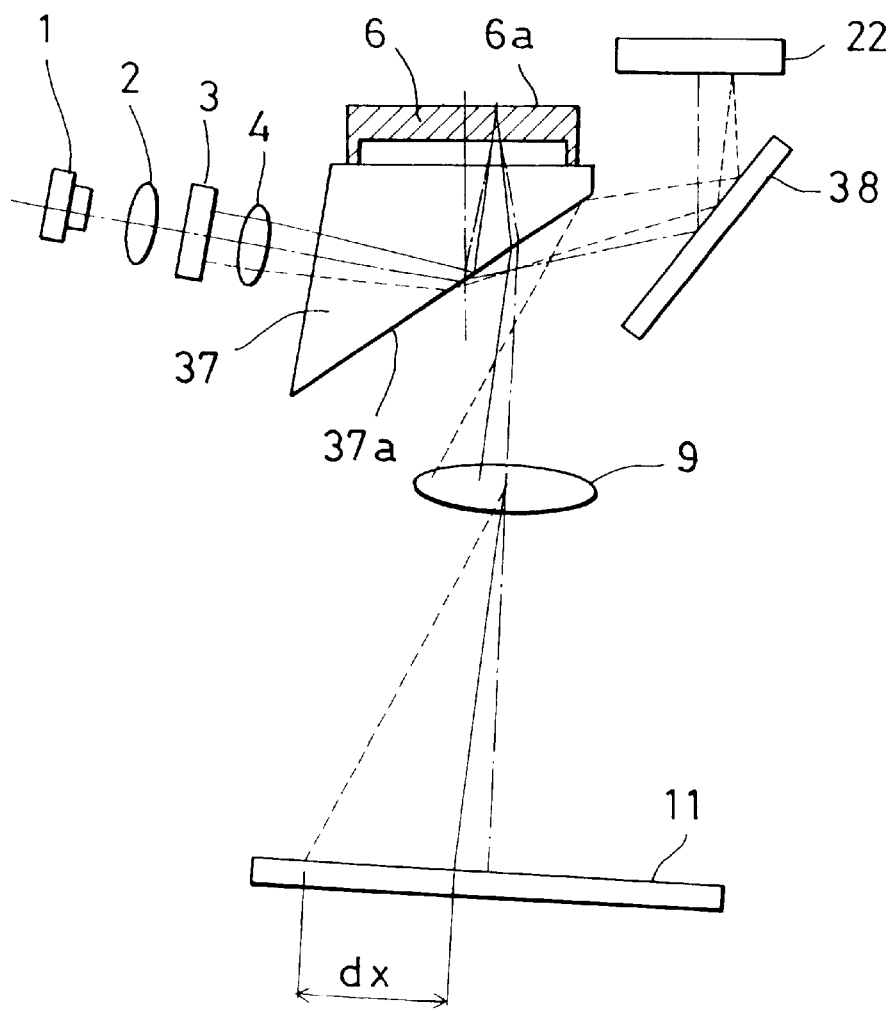
FIG. 9 is a schematical block diagram of an essential part of a sixth embodiment of the present invention.
Figure 10:
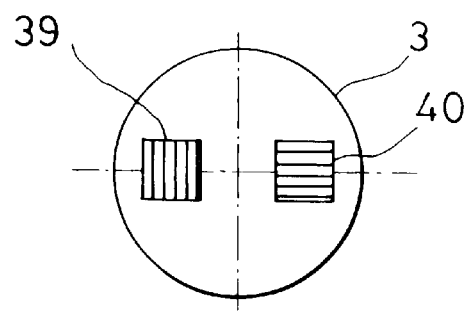
FIG. 10 is a drawing to explain a pattern used in the sixth embodiment.

Referring to FIG. 9 and FIG. 10, description will be given now on a sixth embodiment of the tilt detecting device.

In this embodiment, the functions of the first light source 1 and the second light source 17 in the first embodiment shown in FIG. 1 are fulfilled by a single light source.

On an optical axis of the first light source 1, the first condenser lens 2, the first pattern 3, and the second condenser lens 4 are sequentially arranged. A beam splitter 37 is positioned to face the second condenser lens 4, and the liquid member 6 sealed in a container (not shown) is disposed on the upper surface of the beam splitter 37. A reflection means 38 such as a mirror is arranged on an opposite side of the second condenser lens 4 with the beam splitter 37 between the reflection means 38 and the second condenser lens 4, and a reflection member 22 is disposed to face a reflection surface of the reflection means 38. The reflection member 22 is mounted on a fixed structural member such as a housing of the tilt detecting device itself. When the tilt detecting device itself is set at the horizontal position, the reflection surface is aligned with the horizontal direction.

The third condenser lens 9, and further, the photodetection means 11 are arranged to face the free liquid surface 6a of the liquid member 6.

Patterns 39 and 40 are formed on each side of the first pattern 3 with the optical axis therebetween. The optical arrangement is designed in such manner that the light beam passing through the pattern 39 is directed toward the liquid member 6 and the light beam passing through the pattern 40 is directed toward the reflection member 22.

The first light source 1, the first condenser lens 2, the first pattern 3, the second condenser lens 4, and the beam splitter 37 make up together a free liquid surface light projecting system. The first light source 1, the first condenser lens 2, the first pattern 3, the second condenser lens 4, the beam splitter 37, and the reflection means 38 make up together a fixed reflection member light projecting system. The beam splitter 37 and the third condenser lens 9 make up together a photodetection optical system.

The light beam emitted from the first light source 1 is turned to a parallel beam by the first condenser lens 2, and the parallel beam passes through the first pattern 3. Among the parallel light beam passing through the first pattern 3, the light beam passing through the pattern 39 is reflected by the semi-transmitting surface 37a of the beam splitter 37 and reaches the free liquid surface 6a. The first pattern 3 and the free liquid surface 6a are at positions conjugate to each other, and an image of the pattern 39 is formed on the free liquid surface 6a. The light beam reflected by the free liquid surface 6a and passing through the semi-transmitting surface 37a forms an image on the photodetection means 11 by the third condenser lens 9.

The light beam passing through the pattern 40 passes through the semi-transmitting surface 37a and is reflected and deflected by the reflection means 38 and is directed toward the reflection member 22. Further, the light beam reflected by the reflection member 22, the reflection means 38 and the semi-transmitting surface 37a forms an image on the photodetection means 11 by the third condenser lens 9.

On the photodetection means 11, the image of the pattern 39 reflected by the free liquid surface 6a and the image of the pattern 40 reflected by the reflection member 22 are formed at the same time.

When the tilt detecting device itself is tilted, the free liquid surface 6a is relatively tilted with respect to the tilt detecting device itself because the free liquid surface is maintained in the horizontal direction.

The optical system as described above is integrated with and fixed on the tilt detecting device itself, and the photodetecting position of the pattern 39 on the photodetection means 11 is moved in association with the tilting.

The amount of movement is given, as described above by the equation (1):

$$L = f \times \tan(2n\theta)$$

where $\theta$ is a tilt angle of the free liquid surface 6a, n is refractive index of the liquid, and f is a focal length of the third condenser lens 9.

On the other hand, the pattern 40 reflected by the reflection member 22 is not changed even when the tilt detecting device itself is tilted, and the photodetecting position on the photodetection means 11 is not changed. Therefore, by detecting displacement of the positions of the images of the patterns 39 and 40, it is possible to obtain tilt angle of the tilt detecting device itself.

Next, when the reflection member 22 is mounted on an assembly or a component which is removably mounted on the tilt detecting device itself, and if it is wanted to set the assembly or the component in a horizontal position, the reflection member 22 should be made parallel to the free liquid surface 6a. Therefore, if it is supposed that deviation between the photodetecting position of the pattern 39 received at the photodetection means 11 and photodetecting position of the pattern 40 is 0, the free liquid surface 6a and the reflection member are in parallel to each other. Thus, leveling operation should be performed on the tilt detecting device itself in such direction that the deviation will be 0. Accordingly, when a plurality of assemblies and components are removably mounted on the tilt detecting device, the entire system can be used with horizontality compensated with high accuracy.

According to the present invention, the tilt detecting device for detecting tilt by a reflection light from a free liquid surface comprises a photodetection element, a liquid member for forming the free liquid surface, a fixed reflection member fixed on a structural member, a free liquid surface light projecting system for projecting a light toward the liquid member, a fixed reflection member light projecting system for projecting a light toward the fixed reflection member, a photodetection optical system for guiding the reflection light from the free liquid surface of the liquid member and a reflection light from the fixed reflection member toward the photodetection element, and an arithmetic processing unit for calculating deviation based on two reflection images received by the photodetection element and tilting of the device itself. Thus, accurate tilting can be detected without being influenced by error over time and by the change of environmental temperature. Further, when the fixed reflection member is mounted on an assembly other than the assembly, on which the tilt detecting device is placed, tilting of the entire system including other assembly can be detected.

What is claimed is:

1. A tilt detecting device for detecting tilt by a reflection light from a free liquid surface, comprising a photodetection element, a liquid member for forming said free liquid surface, a fixed reflection member fixed on a structural member, a free liquid surface light projecting system for projecting a light toward said liquid member, a fixed reflection member light projecting system for projecting a light toward said fixed reflection member, a photodetection optical system for guiding the reflection light from said free liquid surface of said liquid member and a reflection light from said fixed reflection member toward said photodetection element, and an arithmetic processing unit for calculating deviation based on two reflection images received by said photodetection element.

2. A tilt detecting device according to claim 1, wherein a first pattern is provided in said free liquid surface light projecting system, and a second pattern is provided in said fixed reflection member light projecting system, and the reflection images are pattern images.

3. A tilt detecting device according to claim 1, wherein said first pattern and said second pattern are darkfield patterns.

4. A tilt detecting device according to claim 1, wherein said free liquid surface light projecting system and said fixed reflection member light projecting system project linearly polarized light beams of the same phase, wherein a $\lambda/4$ polarization member is provided in a common optical path for incidence and reflection of the light to and from said liquid member, wherein a λ/4 polarization member is provided in a common optical path for incidence and reflection of the light to and from said fixed reflection member, and wherein said photodetection optical system comprises a polarization optical member, which allows only the reflection light from said liquid member and said fixed reflection member to pass.

5. A tilt detecting device according to claim 4, wherein a direction of polarization of the projected light beam is determined by a polarizing plate.

6. A tilt detecting device according to claim 1, wherein each of said free liquid surface light projecting system, said fixed reflection member light projecting system, and said photodetection optical system comprises a beam splitter, and said beam splitter has a surface tilted with respect to a transmission light passing through a semi-transmitting surface.

7. A tilt detecting device according to claim 1, wherein said free liquid surface light projecting system and said fixed reflection member light projecting system comprise a common light source, and a beam splitter for splitting the light beam from said light source to a light beam directed to said liquid member and a light beam directed to said fixed reflection member.

8. A tilt detecting device according to claim 7, wherein there is provided a pattern arranged in such manner that the light beam from said common light source can pass through, and said pattern further comprises a pattern where the light beam directed to said liquid member can pass through and a pattern where the light beam directed to said fixed reflection member can pass through.

9. A tilt detecting device according to claim 1, wherein said liquid member is accommodated in a container, and an upper surface of said container is tilted with respect to the transmission light passing through said free liquid surface.

10. A tilt detecting device according to claim 1, wherein said free liquid surface light projecting system comprises a half-mirror for reflecting the light beam toward said liquid member and for allowing the reflection light from said liquid member to pass, and said half-mirror and said liquid member are optically integrated with each other.

11. A tilt detecting device according to claim 10, wherein said half-mirror and said liquid member are optically integrated with each other via an optical member.

12. A tilt detecting device according to claim 11, wherein a refractive index of said liquid member is approximately equal to a refractive index of said optical member.

13. A tilt detecting device according to claim 11, wherein an anti-reflection membrane is provided between said liquid member and said optical member.

* * * * *